(12) United States Patent
Koenig et al.

(10) Patent No.: US 10,077,017 B2
(45) Date of Patent: Sep. 18, 2018

(54) DEVICE FOR CONTROLLING PERSONAL PROTECTION MEANS IN A VEHICLE

(71) Applicants: Robert Bosch GmbH, Stuttgart (DE); Monika Nitschke, Asperg (DE)

(72) Inventors: Simon Koenig, Stuttgart (DE); Werner Nitschke, Asperg (DE); Dirk John, Korntal-Muenchingen (DE); Gunther Lang, Stuttgart (DE); Mustafa Ajanovic, Sindelfingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 362 days.

(21) Appl. No.: 14/890,841

(22) PCT Filed: May 6, 2014

(86) PCT No.: PCT/EP2014/059152
§ 371 (c)(1),
(2) Date: Nov. 12, 2015

(87) PCT Pub. No.: WO2014/184041
PCT Pub. Date: Nov. 20, 2014

(65) Prior Publication Data
US 2016/0075294 A1    Mar. 17, 2016

(30) Foreign Application Priority Data
May 13, 2013    (DE) .................. 10 2013 208 686

(51) Int. Cl.
*B60R 21/0132* (2006.01)
*B60R 21/00* (2006.01)

(52) U.S. Cl.
CPC .. *B60R 21/0132* (2013.01); *B60R 2021/0004* (2013.01); *B60R 2021/01322* (2013.01)

(58) Field of Classification Search
None
See application file for complete search history.

(56) References Cited

U.S. PATENT DOCUMENTS 5,540,461 A * 7/1996 Nitschke ............. B60R 21/0132
280/735
5,883,442 A * 3/1999 Saito ................... B60R 21/0132
180/282

(Continued)

FOREIGN PATENT DOCUMENTS

DE         102 27 003      1/2004
DE      10 2004 029373     1/2006
(Continued)

OTHER PUBLICATIONS

International Search Report for PCT/EP2014/059152, dated Jul. 24, 2014.

*Primary Examiner* — Kimberly S Berona
*Assistant Examiner* — Michael F Whalen
(74) *Attorney, Agent, or Firm* — Norton Rose Fulbright US LLP; Gerard Messina

(57) ABSTRACT

A device for controlling personal protection apparatus in a vehicle includes: at least one sensor unit that acquires at least one physical quantity; and evaluation and control unit which (i) produces, from the at least one acquired physical quantity, at least one signal curve that characterizes an impact, (ii) determines, as a function of an energy dissipation behavior of the vehicle, at least one temporal phase in the produced signal curve, and (iii) evaluates the at least one phase for crash classification and for a triggering decision for the personal protection apparatus. The evaluation and control unit retroactively calculates at least one feature of the energy dissipation based on a characteristic time in the signal curve that represents the end of a first temporal phase.

14 Claims, 6 Drawing Sheets

(56) References Cited

U.S. PATENT DOCUMENTS

| | | | |
|---|---|---|---|
| 6,219,606 B1 | 4/2001 | Wessels et al. | |
| 6,424,899 B2 * | 7/2002 | Imai | B60R 21/013 701/45 |
| 6,430,489 B1 * | 8/2002 | Dalum | B60R 21/0132 280/735 |
| 6,480,772 B1 * | 11/2002 | Ugusa | B60R 21/0132 180/271 |
| 7,031,815 B2 | 4/2006 | Imai et al. | |
| 2003/0222441 A1 * | 12/2003 | Andres | B60R 21/0132 280/735 |
| 2006/0074537 A1 | 4/2006 | Shen | |
| 2010/0004819 A1 * | 1/2010 | Katz | B60R 21/0132 701/36 |
| 2016/0140781 A1 * | 5/2016 | Lang | B60R 21/0136 701/33.7 |

FOREIGN PATENT DOCUMENTS

| | | | | |
|---|---|---|---|---|
| DE | 10 2005 024319 | | 12/2006 | |
| DE | 10 2006 038348 | | 2/2008 | |
| DE | 102006038348 A1 * | | 2/2008 | ......... B60R 21/0136 |
| DE | 10 2008 040590 | | 1/2010 | |
| DE | 10 2010 003333 | | 9/2011 | |
| EP | 2 093 109 | | 8/2009 | |
| EP | 2913230 A4 * | | 7/2016 | ......... B60R 21/0136 |
| JP | H10291459 A | | 11/1998 | |
| JP | 2001106018 A | | 4/2001 | |
| JP | 2002019570 A | | 1/2002 | |
| JP | 2003261003 A | | 9/2003 | |
| JP | 2010023741 A | | 2/2010 | |
| JP | 2011168276 A | | 9/2011 | |
| WO | WO 03/101786 | | 12/2003 | |

* cited by examiner

DEVICE FOR CONTROLLING PERSONAL PROTECTION MEANS IN A VEHICLE

BACKGROUND OF THE INVENTION

1. Field of the Invention

The present invention relates to a device for controlling personal protection means in a vehicle.

2. Description of the Related Art

The detection of front crashes in airbag control devices is in most cases based on acceleration sensors that sense in the longitudinal direction of the vehicle, situated for example centrally on the tunnel, but also at positions on the vehicle periphery, such as on the front end, or symmetrically on the two B pillars, etc. Here, in crashes against hard obstacles (e.g. a wall), higher acceleration signals are measured than in the case of crashes against soft obstacles at the same speed, in which restraint means or personal protection means nonetheless have to be activated. Therefore, it is an important requirement for triggering algorithms for personal protection means to be able to distinguish between fast crashes against soft obstacles (e.g. ODB crash, Euro NCAP) and slow crashes against a hard obstacle in which triggering should not take place (e.g. AZT insurance test).

Possibilities for distinguishing the two types of crash result from additional sensor mechanisms, such as for example up-front sensors, acceleration sensors that sense in the transverse direction of the vehicle, structure-borne sound sensors, predictive sensor systems, or through the use of the vehicle inherent speed. The disadvantages of these recognitions are their additional costs (sensor equipment), or, in the case of the use of the inherent speed, the disadvantage that the speed of the object crashed against is not taken into account, so that a false effective crash speed is assumed.

The triggering algorithms used here also use processed sensor signals, in addition to the measured acceleration signal. The intention and purpose of these processed features is, inter alia, to also include the history of the crash in the triggering features along with the currently measured acceleration value. Such processed features are for example a first or second acceleration integral having corresponding start and stop conditions that reproduce the decrease in speed or forward displacement of a freely flying mass during the crash, sliding window integrals without start-stop conditions that reproduce the decrease in speed over a fixed time range, acceleration signals low-pass-filtered in some other way, and/or integrals/window integrals over the magnitude, or a square of the magnitude, of pre-processed acceleration signals, which are a measure of the dynamic characteristic of the signal. All these features have in common that they can be continuously calculated during the course of the crash. In this way, the current feature value takes into account the overall history of the crash. For the crash classification and triggering decision of personal protection means, the current feature values are now continuously compared to threshold values, or feature combinations are compared to characteristic fields.

In Published German patent application document DE 10 2006 038 348 A1, a device is disclosed for crash classification having at least one sensor unit and an evaluation and control unit that evaluates the signals acquired by the at least one sensor unit for crash classification. Here, the at least one sensor unit is situated in the central region of the vehicle, and the signals acquired by the at least one sensor unit are evaluated by the evaluation and control unit taking into account known physical properties of the associated vehicle. The evaluation and control unit determines at least two temporal phases in the acquired signal curve, and infers a first type of crash, relating for example to an angular crash, an offset crash, and/or a crash against a pole, when the evaluation of the acquired signal curve yields the result that after a first temporal phase having at least one high signal amplitude that represents an impact of an outer region of a front of the vehicle against an obstacle, there occurs a second temporal phase having an essentially flat signal curve.

BRIEF SUMMARY OF THE INVENTION

The device according to the present invention for controlling personal protection means in a vehicle has, in contrast, the advantage that information about the course of the crash or the history of the crash is not obtained via a feature calculation that runs permanently or that starts after the beginning of the crash; rather, at a few targeted times in the course of the crash, a retrospective evaluation of the course of the crash is carried out. Therefore, the acceleration values of the crash remain available in a ring buffer for a sufficiently long period of time. The feature formation over the previous course of the crash then includes not only "blurred" integral features, but rather advantageously also permits the acquisition of quite concrete signal characteristics and signal waveforms that are possible only in retrospect. These signal characteristics can be better confirmed with physical crash models, and are therefore better suited for crash discrimination and permit a more precise and more robust activation of the personal protection systems such as air bags, seat belts, etc.

The permanently running feature calculation in conventional algorithms has the disadvantage that the crash history is reproduced in "blurred" fashion in these features. For example, many different acceleration signal curves are conceivable that, at a particular point in time, have the same acceleration value and the same first integral. As a result, different acceleration curves belonging to different physical crash events cannot be distinguished from one another. This can result in a suboptimal triggering of the personal protection systems.

The core idea of the present invention is to detect one, or a few, characteristic times in the signal curve. These times are identified through different phases of the energy dissipation. The first phase of the energy dissipation is determined by the deformation of the frontmost crush zone elements, such as the bumper and crash box. Thus, an advantageous first characteristic time is the end of the first energy dissipation, which can be recognized by a signal decrease or via an adequately long plateau. In a similar way, further phases of the energy dissipation can be defined. At a characteristic time, various features of the energy dissipation up to this point are then calculated retroactively from a ring buffer that stores the acceleration data over a sufficiently long time span. These features are evaluated and, via particular combinations of features, a crash classification is carried out and a triggering decision is made for the personal protection systems.

The retrospective evaluation of the first energy dissipation advantageously permits a calculation of significantly more precise features than the continuous feature calculation. In addition, it also allows the calculation of adapted or adaptive features, in which certain characteristics of the first energy dissipation can enter into the feature calculation. Because these features are a consequence of a defined deformation process in the crush zone, from them it is possible to determine the speed and type of an impact, such as for example hard, soft, full coverage, offset, etc., more precisely than with the use of conventional algorithms. This advantageously enables a more precise and more robust crash classification.

Specific embodiments of the device according to the present invention for controlling personal protection means in a vehicle can evaluate not only acceleration sensors on the tunnel that sense centrally in the longitudinal direction of the vehicle, but can also evaluate other acceleration sensors, configured symmetrically on the vehicle periphery, and sensing in the longitudinal direction of the vehicle. Thus, for example in the area of the B pillar, a sensor can be situated at each of the left and right sides of the vehicle. In addition, sensors that sense in the transverse direction of the vehicle can also be included in the evaluation. In the evaluation of multiple sensors, a separate evaluation of the sensor signals with subsequent feature fusion permits a more precise crash discrimination than a calculation to a mean value signal. A separate evaluation of acceleration sensors sensing in different vehicle directions with subsequent feature fusion advantageously also enables a recognition of angular crashes.

Specific embodiments of the device according to the present invention for controlling personal protection means in a vehicle can be used not only by themselves, but also in interaction with conventional devices having continuous feature calculation and feature evaluation.

Specific embodiments of the present invention provide a device for controlling personal protection means in a vehicle having at least one sensor unit that acquires at least one physical quantity, and an evaluation and control unit produces from the at least one acquired physical quantity at least one signal curve that identifies an impact. Here, the evaluation and control unit determines, as a function of an energy dissipation behavior of the vehicle, at least one temporal phase in the produced signal curve, and evaluates this phase for crash classification and in order to make a triggering decision for personal protection means. According to the present invention, the evaluation and control unit determines at least one first characteristic time in the signal curve that represents the end of a first temporal phase, and, based on the at least one first characteristic time, retroactively calculates at least one feature of the energy dissipation. The evaluation and control unit carries out the crash classification and triggering decision for personal protection means as a function of the at least one retroactively calculated feature.

It is particularly advantageous that from existing acceleration signals the first prominent change in the force level curve is recognized in particular also for soft crashes. Based on this, specific embodiments of the device according to the present invention for controlling personal protection means in a vehicle permit a reliable distinction of hard and soft crash types. In addition, specific embodiments of the device according to the present invention for controlling personal protection means in a vehicle permit better recognition of a soft crash and optimization of the triggering decision for the personal protection means, without additional sensor equipment (costs) and without taking into account possibly false crash speeds.

The structure of the crush zone of the vehicle defines different force levels for crashes. While in the case of crashes against a hard obstacle only the structures of the vehicle itself are deformed and a change in force level can easily be recognized, in a soft crash both the vehicle and the object impacted are deformed. Here, depending on the rigidity curve of the crush zones, phases of deformation of the vehicle alternate with phases of deformation of the object impacted. The latter phases are expressed as plateaus in the measured acceleration signal curve. This alternation of deformation phases can advantageously be recognized by specific embodiments of the device according to the present invention for controlling personal protection means in a vehicle through evaluation of the signal curve that characterizes the impact. By distinguishing between hard and soft crash types, the triggering thresholds of the existing triggering algorithm can be adapted to the lower signal curves of a soft crash. Alternatively, depending on the type of crash, hard or soft, different features or combinations of queries, or "triggering paths," can be used for the triggering decision.

In an advantageous embodiment of the device according to the present invention, the first temporal phase of the energy dissipation characteristic is determined by external crush zone elements of the vehicle. The external crush zone elements include for example bumper cross members and crash boxes situated for example between the bumper cross member and a side member.

In a further advantageous embodiment of the device according to the present invention for controlling personal protection means in a vehicle, the evaluation and control unit ascertains a local maximum value in the signal curve. The evaluation and control unit compares the local maximum value in the signal curve for example with at least one threshold value, and can recognize a hard crash or soft crash through this comparison. If the maximum value within the first phase is for example above a first threshold value representing a hard crash, then the evaluation and control unit recognizes a hard crash. If the maximum value within the first phase is above a second threshold value representing a soft crash, but below the first threshold value, the evaluation and control unit then recognizes a soft crash.

In a further advantageous embodiment of the device according to the present invention, the evaluation and control unit determines the first characteristic time in the signal curve as a function of the local maximum value. The functional dependence of the first characteristic time can for example be specified by a threshold value that is to be fallen below after occurrence of the local maximum, absolutely or relative to the value of the local maximum. The evaluation and control unit can determine the first characteristic time for example via a decrease in the signal or in an integrated signal, absolutely or relative to the local maximum value. In addition, a determined time span after or before the occurrence of the local maximum can be specified for the determination of the first characteristic time.

In addition or alternatively, the evaluation and control unit can filter the at least one signal curve with different strengths, and the produced filter curves can be compared to one another in order to ascertain the first characteristic time. Moreover, the evaluation and control unit can determine the first characteristic time using a gradient calculation.

In a further advantageous embodiment of the device according to the present invention, the evaluation and control unit can retroactively calculate, as features for crash classification and for a triggering decision, a maximum force level reached within the first phase and/or a speed that has decreased within the first phase and/or integrals over subregions of the signal curve of the first phase and/or a temporal duration of the first phase and/or a rise time of the signal curve and/or a gradient of a signal curve of the first phase. In addition, the evaluation and control unit can combine and/or link, logically and/or mathematically, the features and/or intermediate quantities calculated retroactively for the first phase, for further evaluation.

In a further advantageous embodiment of the device according to the present invention, the evaluation and control unit can define a second phase following the first phase, via a second characteristic time in the signal curve that represents the end of the second temporal phase. Here, the evaluation and control unit can determine the second characteristic time in the signal curve as a function of a local maximum value occurring after the first characteristic time, and/or via different filter curves, and/or by a gradient calculation and/or via a fixed time span starting from the first characteristic time and/or a fixed speed decrease starting from the first characteristic time and/or a specified overall decrease in speed. In addition, the evaluation and control unit can retroactively calculate a speed that has decreased within the second temporal phase and/or a minimum force level within the second temporal phase.

In a further advantageous embodiment of the device according to the present invention, the evaluation and control unit can combine and/or link, logically and/or mathematically, the features and/or intermediate quantities calculated retroactively for the first and second phase, for further evaluation.

Exemplary embodiments of the present invention are shown in the drawings and are explained in more detail in the following description. In the drawings, identical reference characters designate components or elements that perform identical or analogous functions.

DETAILED DESCRIPTION OF THE INVENTION

As a rule, crush zones of vehicles are designed in such a way that they have different force levels. The frontmost structures of the crush zone have the lowest force level, and the rear structures show the highest force level. When there is deformation of the crush zone, the force level and the measured acceleration therefore change. In the case of crashes against a hard obstacle, in which only the structures of the home vehicle are deformed, there is always a decrease in force between the change of the force levels, due to the plastic deformation of the already-deformed structure. In the case of a soft crash, both the home vehicle and the other vehicle in the collision are deformed. Here, depending on the rigidity curve of the crush zones, phases of deformation of the home vehicle alternate with phases of deformation of the object impacted. In the transition from deformation of the home vehicle to deformation of the other object, the achieved force level often decreases somewhat, and then remains at a fairly constant level (plateau) in the phase of deformation of the other object.

Figure 1:
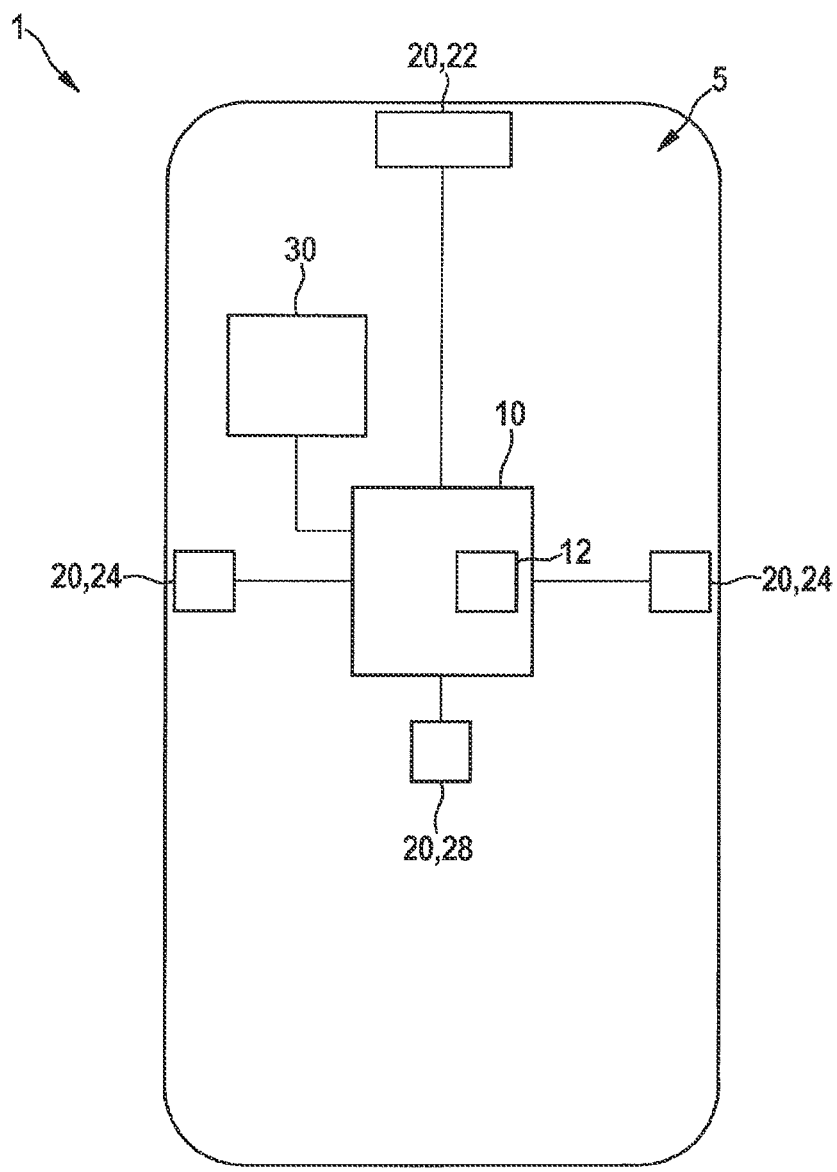
FIG. 1 shows a schematic diagram of an exemplary embodiment of a device according to the present invention for controlling personal protection means in a vehicle.
Figure 2:
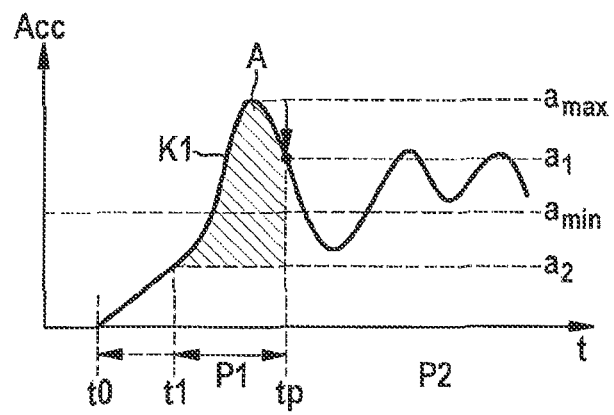
FIG. 2 shows a schematic representation of a signal curve that characterizes an impact, produced and evaluated by the device according to the present invention for controlling personal protection means in a vehicle of FIG. 1.

As can be seen from FIGS. 1 and 2, the depicted exemplary embodiment of a device 5 according to the present invention for controlling personal protection means 30 in a vehicle 1 has at least one sensor unit 20, 22, 24, 26, 28, that acquires at least one physical quantity, and an evaluation and control unit 10 that produces from the at least one acquired physical quantity at least one signal curve Acc that characterizes the impact. As a function of an energy dissipation behavior of vehicle 1, evaluation and control unit 10 determines at least one temporal phase P1, P2 in the produced signal curve Acc, and evaluates these phases for crash classification and for a triggering decision for personal protection means 30.

According to the present invention, evaluation and control unit 10 determines at least one first characteristic time tp in signal curve Acc that represents the end of a first temporal phase P1, and, on the basis of the at least one first characteristic time tp, retroactively calculates at least one feature $a_{max}$, $a_{min}$, A, t2−t1, tp−t1, of the energy dissipation. Evaluation and control unit 10 carries out the crash classification and triggering decision for personal protection means 30 as a function of the at least one retroactively calculated feature $a_{max}$, $a_{min}$, A, t2−t1, tp−t1. In the depicted exemplary embodiment, five sensor units 20, 22, 24, 26, 28 are provided, of which a first sensor unit 22 is situated in the vehicle front area, a second and third sensor unit 24, 26 are situated in the lateral vehicle area, and a fourth sensor unit 28 is situated centrally in vehicle 1. Sensor units 20, 22, 24, 26, 28 include for example acceleration sensors that acquire accelerations in at least one specified spatial direction, such as a vehicle longitudinal direction, a vehicle vertical direction, or a vehicle transverse direction.

In order to evaluate the course of the crash, it is useful to suitably filter the signal ascertained by an acceleration sensor in order to remove resonances, noise, and other undesired effects from the measured signal. This remaining core signal then reflects the "macroscopic" deformation processes occurring during the crash in the crush zone of vehicle 1. In the depicted exemplary embodiment, evaluation and control unit 10 includes at least one internal ring buffer 12 in order to store the signals acquired by sensor units 20, 22, 24, 26, 28 for evaluation for a sufficient period of time. Alternatively, the at least one ring buffer 12 can also be situated outside the evaluation and control unit 10, for example in the individual sensor units 20, 22, 24, 26, 28.

For the definition of the first characteristic time tp, in particular the first energy dissipation, which takes place for example in the bumper cross member and in the crash boxes, is particularly useful. Due to its good reproducibility, this first energy dissipation is suitable for permitting inferences concerning the type of crash and crash speed, especially since the required triggering times also temporally fall in this region, and a deformation of structures situated behind them, such as for example a longitudinal bearer, is not to be expected.

Each deformation process is characterized by a sequence of elastic deformation, plastic deformation, and subsequent tearing or bending. Therefore, the characteristic first energy dissipation is for example recognized in that a certain minimum craft level $a_{min}$, typical for bumper cross members and crash boxes, has been exceeded, and subsequently a sufficiently deep decrease in the signal takes place. This decrease can be evaluated either absolutely or in relation to the achieved maximum force level $a_{max}$. As can be further seen from FIG. 2, for example a decrease of 25% (i.e., to 75%), relative to the reached maximum $a_{max}$, can be calculated as first threshold value $a_1$ in order to determine first characteristic time tp. The precise values for the minimum force level $a_{min}$ and the required (relative) signal decrease $a_1$ are particularly advantageously provided as parameters that can be set.

The time region starting from crash beginning t0 up to the detected decrease in force at time tp is then designated first phase P1 of the energy dissipation. Alternatively, the small signals immediately at the beginning of the crash can also be excluded, and the first phase P1 of the energy dissipation can be started only beginning from a time t1 at which signal curve K1 reaches a specified second threshold value $a_2$. Analogously to first threshold value $a_1$, this second threshold value $a_2$ can be measured absolutely or in relation to the reached maximum $a_{max}$ of first phase P1 of the energy dissipation. In FIG. 2, for example a relative threshold of 25% of the reached maximum $a_{max}$ has been selected as the beginning of this first phase P1.

Alternatively, other methods are conceivable for recognizing first phase P1 of the energy dissipation and thus the first characteristic time tp in the course of the crash. In the following, further methods are described for recognizing first characteristic time tp, with reference to FIGS. 7 through 10.

From first phase P1 of the energy dissipation, some physical features can now be derived that are characteristic for the deformation process that has taken place, and that therefore permit inferences concerning the type of crash and the crash speed. Thus, for example the maximum $a_{max}$ of the acquired acceleration, which represents the force level that has been reached in the crush zone, and/or an integral over the acceleration values of first phase P1, which represents the decreased speed Dv1, and/or an integral over sub-regions A, $a_1$, $a_2$ of the first energy dissipation and/or temporal duration (tp−t1) or width of first phase P1 of the first energy dissipation and/or rise time (t2−t1) and/or gradient G and/or signal waveform of the first energy dissipation and/or a combination of these features, such as for example ratios of the individual features to one another, etc., can be calculated and used for the evaluation.

Figure 3:
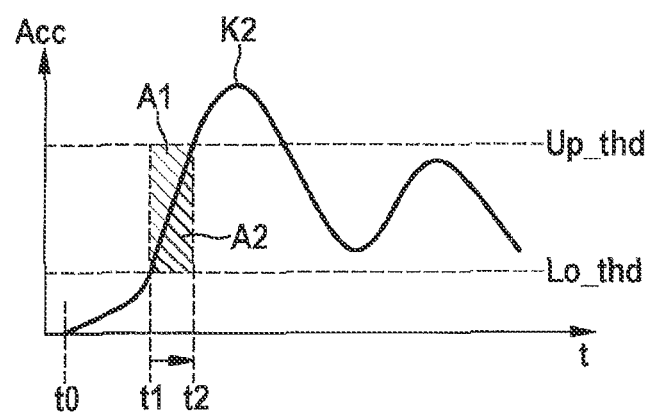
FIG. 3 shows a schematic representation of a signal curve that characterizes an impact in the case of a hard crash, produced and evaluated by a conventional device for controlling personal protection means in a vehicle.
Figure 4:
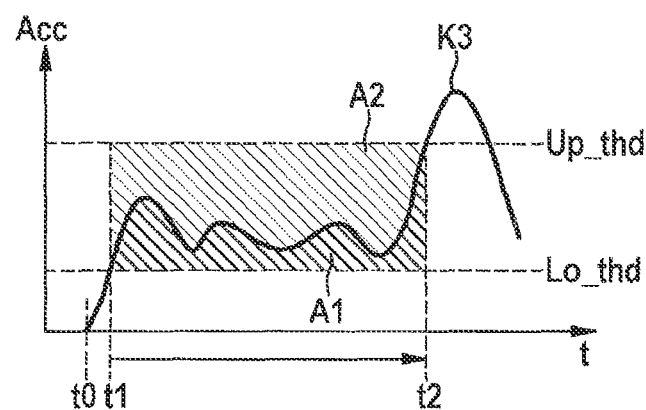
FIG. 4 shows a schematic representation of a signal curve characterizing an impact in the case of a soft crash, produced and evaluated by a conventional device for controlling personal protection means in a vehicle.

In each of FIGS. 3 and 4, a conventional ascertaining of a rise time (t2−t1) is shown. For this purpose, the duration (t2−t1) is ascertained, which requires the suitably filtered acceleration signal K2, K3 in order to rise from a fixed lower threshold Lo_thd to a fixed upper threshold Up_thd. Lower threshold Lo_thd can often also be equated with the start threshold of the algorithm. The duration (t2−t1) can be ascertained either directly via a time counter or indirectly via a first surface A1 between acceleration signal K2, K3 and lower threshold Lo_thd, or via a second surface A2 between upper threshold Up_thd and acceleration signal K2, K3.

This method is shown schematically in FIG. 3 for the example of a first signal curve K2 that represents a crash against a hard wall, and in FIG. 4 relative to the example of a second signal curve K3 that represents a crash into a soft obstacle. Threshold values Up_thd, Lo_thd were here placed for the correct measurement of the rise of the hard crash. Because these threshold values Up_thd, Lo_thd are however now fixed, they are not suitable for the evaluation of the rise for the soft crash: this does indeed initially also show a steep rise, but due to the yielding of the soft barrier there then however occurs a plateau in force curve K3. In the case of a soft crash, the evaluation relative to fixed thresholds therefore supplies a significantly greater rise time, and is therefore not a suitable measure for evaluating the crash speed or crash severity.

Figure 5:
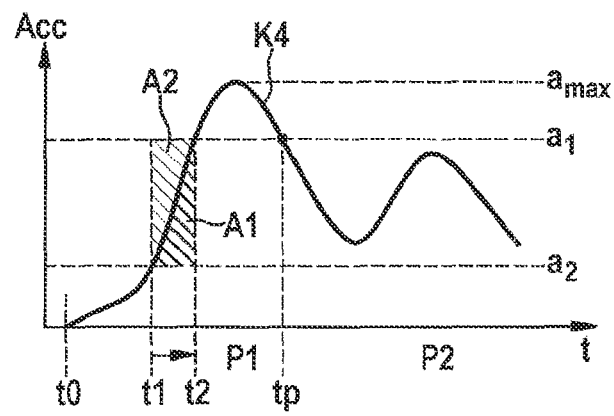
FIG. 5 shows a schematic representation of a signal curve characterizing an impact in the case of a hard crash, produced and evaluated by the device according to the present invention for controlling personal protection means in a vehicle of FIG. 1.

In contrast, FIG. 5 shows a retrospective and adaptive ascertaining of the rise time (t2−t1) from signal curve K4. For this purpose, first the end of first phase P1 of the energy dissipation at first characteristic time tp must be awaited. Once this has taken place, the rise evaluation can take place retroactively and using adapted threshold values $a_1$, $a_2$. Here it is particularly advantageous to select lower threshold value $a_2$ and upper threshold value $a_1$ in relation to the reached maximum $a_{max}$ of first phase P1 of the energy dissipation. Thus, for example the time duration (t2−t1) of the rise of signal curve K4 from 25% to 75% of the maximum $a_{max}$ can be determined, so that the upper, or first, threshold value $a_1$ is identical with the threshold value that represents first characteristic time tp. The precise percent values for threshold values $a_1$, $a_2$, $a_{min}$ are particularly advantageously provided as parameters that can be set.

Figure 6:
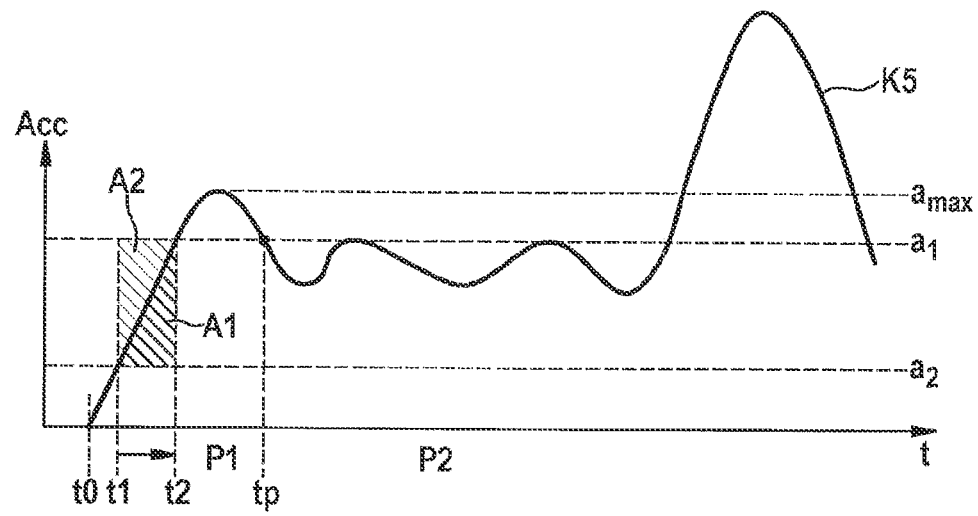
FIG. 6 shows a schematic representation of a signal curve characterizing an impact in the case of a soft crash, produced and evaluated by the device according to the present invention for controlling personal protection means in a vehicle of FIG. 1.

With this feature selection adapted to first phase P1 of the energy dissipation, it is now possible to correctly acquire, also for the signal curve K6 shown in FIG. 6 of a soft crash, the rapid rise in acceleration through a short rise time (t2−t1) ascertained relative to a first local maximum $a_{max}$ of the signal curve. The rise time (t2−t1) can in turn be ascertained directly using a time counter, or indirectly via the calculation of hatched surfaces A1, A2. Because threshold values $a_1$, $a_2$ are themselves scaled with achieved local maximum $a_{max}$ of signal curve K5, these surfaces A1, A2 are then usefully also normed with the value of local maximum $a_{max}$ for the correct ascertaining of the time.

From rise time (t2−t1) determined in this way, gradient G can now be ascertained through simple quotient formation according to equation (G1).

$$G = \text{delta}\_a/(t2-t1) \tag{G1}$$

For the depicted exemplary embodiment, there results:

$$G=(0.75*a_{max}-0.25*a_{max})/(t2-t1)=a_{max}/(2*(t2-t1))$$

For some crash types (e.g. ODBs), the required triggering time is situated later than the first characteristic time tp at the end of first phase P1 of the energy dissipation. Therefore, for a precise and robust triggering decision it makes sense to use the remaining span of time, still available for a timely crash classification, for a further evaluation.

This second phase P2 of the energy dissipation can be defined in many different ways. For example, the recognition of a second characteristic time that represents the end of second phase P2 of the energy dissipation can take place similar to the above-described recognition of the first characteristic time tp at the end of first phase P1 of the energy dissipation, and/or through a fixed time span starting from first characteristic time tp at the end of first phase P1, and/or through a fixed speed decrease Dv2 starting from first characteristic time tp at the end of first phase P1. Alternatively, it is possible to wait until a particular overall speed decrease Dv has been reached in the course of the crash as a whole. In this case, in the case of crashes that have undergone a strong speed decrease Dv1 during first phase P1, second phase P2 is correspondingly shorter in duration, and vice versa.

As features for the energy dissipation in second phase P2, for example similar features can be calculated as for first phase P1 of the energy dissipation. Thus, for example during second phase P2 the acquired acceleration is summed, and the speed decrease Dv2 is calculated for second phase P2. In addition, an acceleration minimum $a_{min}$ during second phase P2 can be determined.

In addition, features can also be generated that evaluate first phase P1 and second phase P2 together. In particular, the ratios or quotients of corresponding partial features permit inferences concerning the uniformity of the course of the acceleration. Thus, for example the ratio of speed decrease Dv2 in second phase P2 to speed decrease Dv1 in first phase P1, and/or the ratio of speed decrease Dv2 in second phase P2 to the overall speed decrease Dv, and/or the ratio of acceleration maximum $a_{max}$ in second phase P2 to acceleration maximum $a_{max}$ in first phase P1, and/or the ratio of the average acceleration in second phase P2 to the average acceleration in first phase P1, and/or the ratio of the average acceleration in second phase P2 to the acceleration maximum $a_{max}$ in first phase P1, and/or the ratio of acceleration minimum $a_{min}$ in second phase P2 to acceleration maximum $a_{max}$ in first phase P1, and/or the ratio of the difference between acceleration maximum $a_{max}$ in first phase P1 and acceleration minimum $a_{min}$ in second phase P2 and acceleration maximum $a_{max}$ in first phase P1, can be calculated as features and evaluated for crash classification and for the triggering decision. Analogously, still further crash phases can be defined.

For crash discrimination, all described features can be used. It is most suitable to evaluate a combination of features in order in this way to make it possible to precisely recognize individual crash types. For example, hard crashes having 100% coincidence and speeds greater than 20 km/h are distinguished from non-triggering situations by high values in acceleration maximum $a_{max}$, by small values in the rise time (t2-t1), and by small values in the duration (t2-t1) of first phase P1 of the energy dissipation. Offset crashes into a soft obstacle (ODB) are distinguished from non-triggering situations for example by small values in the rise time (t2-t1) of the first phase P1 of the energy dissipation, by small values in the minimum of second phase P2 of the energy dissipation, and by a high value in the ratio of speed decrease Dv2 in second phase P2 to speed decrease Dv1 in first phase P1. Therefore, it makes sense to combine characteristic crash types in so-called triggering paths that compare differently ascertained features to threshold values. The results of the feature queries can then be logically linked. An example of such a triggering path is shown in FIG. 7.

For all the above-described features, represented by ratios or quotients, division can also be avoided by, in the course of the threshold value comparison (feature=numerator/denominator>threshold?), multiplying the denominator at the threshold value side; i.e., carrying out the threshold value query in the form (numerator>threshold value*denominator?), or varying the threshold value in some other way as a function of the denominator.

The output of such a triggering path can now be used directly or indirectly for controlling personal protection means 30. Indirect controlling here includes for example a delaying of the triggering for certain crash types for which the required triggering time has not yet been reached at the calculation time, and/or a combination with features of a conventional algorithm that works with continuously calculated features. This combination can for example take place through a logical AND linkage, and/or through a threshold value adaptation in a conventional algorithm on the basis of the results of the feature calculation according to the present invention.

Figure 7:
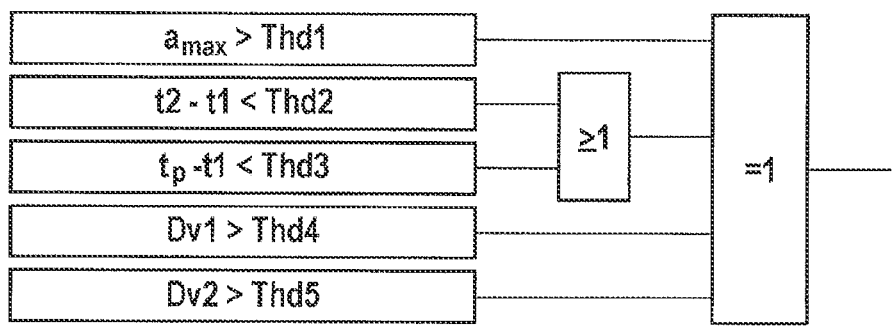
FIG. 7 shows a schematic representation of a triggering path of the device according to the present invention for controlling personal protection means in a vehicle of FIG. 1.

As can be seen from FIG. 7, in the depicted triggering path, as first feature it is checked whether the ascertained local maximum $a_{max}$ is greater than a first threshold value Thd1. As second feature, it is checked whether the rise time (t2-t1) is less than a second threshold value Thd2. As third feature, it is checked whether the duration (tp-t1) of first phase P1 is shorter than a third threshold value Thd3. As fourth feature, the second and third features are linked to one another by a logical OR function. As fifth feature, it is checked whether speed decrease Dv1 during first phase P1 is greater than a fourth threshold value Thd4. As sixth feature, it is checked whether speed decrease Dv2 during second phase P2 is greater than a fifth threshold value Thd5. To produce a triggering signal for the personal protection means, in the depicted exemplary embodiment of the triggering path the first feature, the fourth feature, the fifth feature, and the sixth feature are linked to one another by a logical AND function, so that the triggering signal is produced only if the features linked by the logical AND function are true.

As stated above, the change of the force level in the case of a hard crash can easily be recognized by a sufficiently large signal decrease. In the case of a soft crash, the measures described up to now apply only partly, because the decrease in force is not always clear enough; rather, in many cases there arises a force plateau. Therefore, in the following some further methods are described for recognizing this change in deformation phases.

Figure 8:
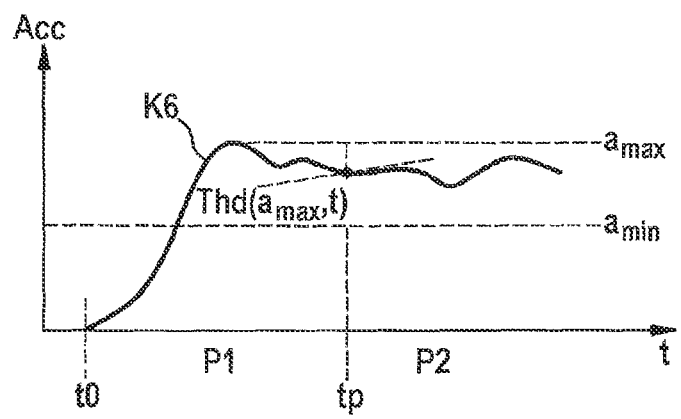
FIG. 8 shows a schematic representation of a signal curve characterizing an impact, in which the device according to the present invention for controlling personal protection means in a vehicle of FIG. 1 recognizes a change in the deformation phase via the signal decrease.

As can be seen from FIG. 8, a first recognition is based on comparing the signal decrease in the depicted signal curve K6 relative to maximum $a_{max}$ absolutely, i.e. $a_{max}-a$, or relatively, i.e. $(a_{max}-a)/a_{max}$, with a threshold Thd($a_{max}$, t). A change is recognized when signal curve K6, which for example represents the acquired acceleration, falls below a time-dependent threshold relating to maximum $a_{max}$. This threshold Thd($a_{max}$, t) is suitably raised as time increases until maximum $a_{max}$ is reached, in order in this way to enable a recognition. That is, a change of the deformation phase is recognized if first inequality (U1)

$$(a_{max}-a)>g(t) \tag{U1}$$

or second inequality (U2) is fulfilled.

$$(a_{max}-a)/a_{max} > f(t) \tag{U2}$$

Second inequality (U2), which evaluates the relative signal decrease, can also be transformed to form third inequality (U3).

$$(a_{max}-a) > f(t)^* a_{max} \tag{U3}$$

From third inequality (U3), the generalized form results according to fourth inequality (U4).

$$(a_{max}-a) > F(a_{max},t) \tag{U4}$$

Accordingly, a change of the deformation phases and of the first characteristic time tp is recognized if the signal decrease exceeds a threshold $F(a_{max}, t)$ that is a function of the achieved maximum $a_{max}$ and of the time t since reaching the maximum $a_{max}$. For better visualization in FIG. 8, fourth inequality (U4) has been transformed into fifth inequality (U5).

$$a < (a_{max} - F(a_{max},t)) = \text{Th}d(a_{max},t) \tag{U5}$$

That is, acceleration a has to fall below a threshold $\text{Thd}(a_{max},t)$ that is a function of the achieved maximum $a_{max}$ and of the time t since reaching maximum $a_{max}$. Typically, the threshold $\text{Thd}(a_{max}, t)$ will increase as maximum $a_{max}$ increases and as time t increases. Instead of time t since reaching maximum $a_{max}$, the threshold value $\text{Thd}(a_{max},t)$ can also be varied with other features that increase in the course of the crash, e.g. the first or second integral of the acceleration.

Instead of maximum $a_{max}$, the threshold value in inequalities (U4) and (U5) can also be varied with another feature that scales with the "signal strength" of the previous signal curve K6, e.g. with an average acceleration.

Figure 9:
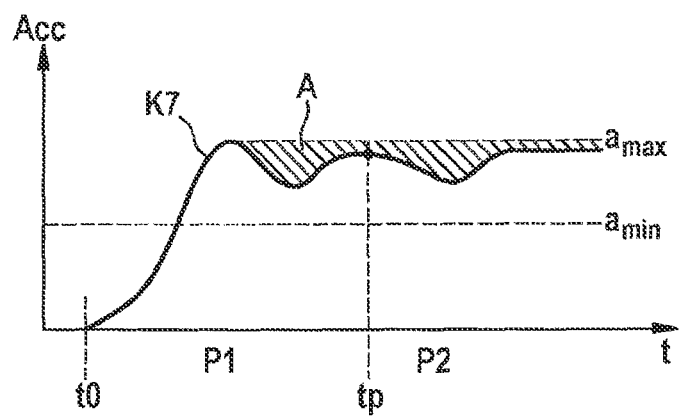
FIG. 9 shows a schematic representation of a signal curve characterizing an impact, in which the device according to the present invention for controlling personal protection means in a vehicle of FIG. 1 recognizes a change in the deformation phase via the integrated signal decrease.

As can be seen from FIG. 9, a second recognition is based on an integrated signal decrease of signal curve K7. In this variant, not only the current value of signal decrease ($a_{max}-a$) of signal curve K7, but its integral A, is evaluated. A change in the deformation phase can for example be recognized when the summed signal difference ($a_{max}-a$) exceeds a certain threshold value. In the depicted exemplary embodiment, this is the case at first characteristic time tp. The summing can here take place over an arbitrarily long time period, or in windowed fashion from ring buffer 12 of evaluation and storage unit 10. Most suitably, this threshold value is also varied relative to the reached signal maximum; i.e., the recognition of the change results from sixth inequality (U6).

$$\Sigma(a_{min}-a_i) > \text{factor} \cdot a_{max} \tag{U6}$$

Instead of with maximum $a_{max}$, the threshold value can also be scaled relative to a different signal strength measure of previous signal curve K7, for example the average acceleration or the integrated acceleration. Therefore, in the most general form this recognition results from seventh inequality (U7).

$$\Sigma(a_{max}-a_i) > F(\{a_i\}) \tag{U7}$$

Here, the expression $\{a_i\}$ includes all acceleration values since the beginning of the event, or features derived therefrom.

Figure 10:
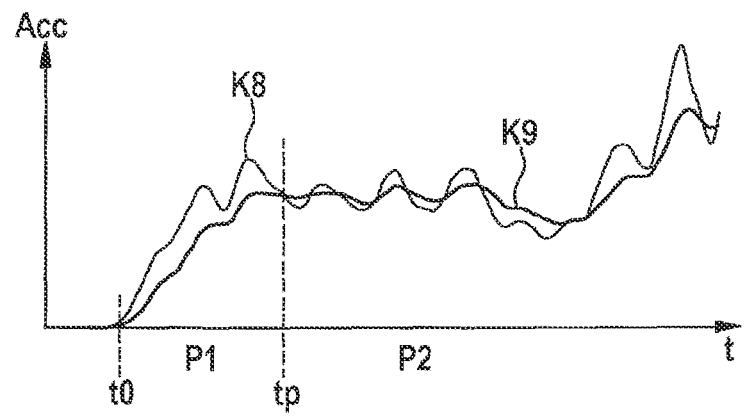
FIG. 10 shows a schematic representation of two filter curves of a signal curve characterizing an impact, in which the device according to the present invention for controlling personal protection means in a vehicle of FIG. 1 recognizes a change in the deformation phase via a filter comparison.

As can be seen in FIG. 10, a third recognition is based on a filter comparison. The third recognition of a change of force level consists in the comparison of differently strongly filtered acceleration values. In FIG. 10, a first signal curve K8 represents a first filter curve, and a second signal curve canine represents a second filter curve. The filtering can here take place using standard low-pass filters, or also via window integrals having different lengths, with norming to the window length. The time at which the more strongly filtered signal of second signal curve K9 reaches or exceeds the value of the more weakly filtered signal of first signal curve K8 corresponds to first characteristic time tp.

A weakly filtered signal having a short memory time will react to the signal rise at the beginning of the crash more quickly than a more strongly filtered signal having a longer memory time. If, however, in the course of the crash the more strongly filtered signal reaches the more weakly filtered signal, this means that the two filtered signals have an equally large average value in their respective "memory time." This is an indication of a constant acceleration, or a force plateau. As can also be seen from FIG. 10, the two signal curves K8, K9 have an equally large average value at first characteristic time tp. Eighth inequality (U8) shows a possible simple query.

$$a_{K9} >= a_{K8} \tag{U8}$$

Here, $a_{K8}$ represents values of first signal curve K8 and $a_{K9}$ represents values of second signal curve K9. Of course, more complex criteria are also conceivable here. Thus, for example it can also be sufficient if the more strongly filtered signal comes sufficiently close to the more weakly filtered signal for some cycles in succession, or the like.

Figure 11:
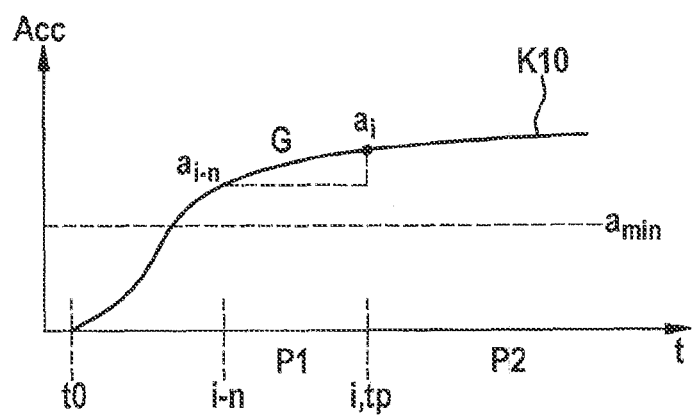
FIG. 11 shows a schematic representation of a signal curve characterizing an impact in which the device according to the present invention for controlling personal protection means in a vehicle of FIG. 1 recognizes a change in the deformation phase via the gradient method.

As can be seen in FIG. 11, a fourth recognition is based on a gradient method. This method is based on detecting a very small signal rise or gradient G of signal curve K 10. Most suitably, this gradient G is evaluated over a plurality of cycles. This means that the signal difference $(a_i - a_{(i-1)})$ is averaged over a plurality of cycles, which is equivalent to ascertaining a difference $(a_i - a_{i-n})$. In addition, gradient G is set in relation to the reached acceleration level. This means that a plateau, and thus a change of the deformation phase, is recognized when the rise of signal curve K10 of the last n cycles falls below a threshold value that is a function of the reached acceleration level. Such a relative gradient is thus given for example by second equation (G2).

$$\text{NormGrad}_i = \frac{a_i - a_{i-n}}{(a_i + a_{i-n})/2} \tag{G2}$$

Here, the signal rise over n cycles is set in relation to the average value of the current acceleration, or the acceleration before n cycles. Alternatively, norming can also take place to the true average value of the last n cycles, as is shown by third equation (G3).

$$\text{NormGrad}_i = \frac{a_i - a_{i-n}}{\Sigma a_j/(n+1)} \tag{G3}$$

Here, the factor $1/(n+1)$ can be omitted for simplicity. Alternatively, the norming with the average acceleration can also be omitted. Accordingly, a plateau can be detected when the (normed) gradient according to ninth inequality (U9) falls below a certain threshold value.

$$\text{NormGrad} < \text{Th}d \tag{U9}$$

In order to avoid division, instead of the norming of the gradient it is also possible for the non-normed gradient to be compared to a threshold that is scaled with the average acceleration of the values under consideration, or, still more generally, is a function of these values, as can be seen from tenth inequality (U10).

$$\text{Grad}_i = a_i - a_{i-n} < \text{Th}d^*(a_i + a_{i-n}) = F((a_i, \ldots a_{i-n})) \tag{U10}$$

Still more generally, the threshold value can also be varied based on all acceleration values since the beginning of the event, as well as on features derived therefrom, such as speed decrease Dv.

The fourth recognition has in particular the advantage that for the recognition no signal decrease is required; rather, a recognition is still possible even given slightly increasing signals. This is not possible in the first two recognition methods, and is possible in the third recognition method only given a sufficiently small filtering difference.

For all the recognition methods described here, it is useful to detect a level change in the course of the crash only when a certain least acceleration level $a_{min}$ has been exceeded. The methods described here for recognizing a change of deformation phases can be used in connection with the retroactive feature calculation from the previous signal or acceleration curve. In the case of crashes against a soft obstacle, the end of the first deformation phase is however characterized precisely by the change from deformation of the home vehicle to deformation of the other object, which is enabled by the above-described recognitions.

The described methods for recognizing the change of deformation phases have been optimized specifically for the recognition of soft crashes. Nonetheless, these conditions are also met by hard crashes, which are easily recognizable via a signal decrease. Because in the case of a hard crash, however, only the home vehicle structure is deformed, the ascertained force level is at a defined high value. In contrast, in the case of a soft crash, with penetration into the other vehicle, this high force value is not reached. Thus, it is possible to distinguish between a hard crash and a soft crash through a simple additional query of the reached force level $a_{max}$. A hard crash is present if a change in force level is recognized and the force level, or the maximum $a_{max}$, is above a first threshold value. A soft crash is present if a force level change is recognized and the force level, or the maximum $a_{max}$, is below a second threshold value. Here, the first threshold value can correspond to the second threshold value.

This distinguishing of hard and soft crash types can be used immediately or indirectly, for example in combination with other recognitions, to make it possible to adapt the triggering thresholds of the main algorithm with respect to soft crashes. After a threshold adaptation, while maintaining the signal features used, it is also conceivable, given recognition of a soft crash, to change over to separate "triggering paths" for soft crashes, in which other signal features or feature combinations are compared to threshold values.

What is claimed is:

1. A device for controlling a personal protection apparatus in a vehicle, comprising:
   at least one sensor unit that acquires at least one physical quantity; and
   an control unit that (i) produces, from the at least one acquired physical quantity, at least one signal curve characterizing an impact, (ii) determine, as a function of an energy dissipation behavior of the vehicle, at least one temporal phase in the produced signal curve, and (iii) evaluates the at least one temporal phase for crash classification and for a triggering decision for the personal protection apparatus;
   wherein the control unit determines at least one first characteristic time in the signal curve, the first characteristic time being an end of a first temporal phase, and, based on the determined first characteristic time, the control unit retroactively calculates at least one feature of an energy dissipation that occurred within the first temporal phase, and wherein the control unit carries out the crash classification and the triggering decision for the personal protection apparatus as a function of the at least one retroactively calculated feature;
   wherein the control unit ascertains a local maximum value in the signal curve, and determines the first characteristic time as a point in time in the signal curve when the signal curve decreases from the ascertained local maximum value by a predefined amount.

2. The device as recited in claim 1, wherein the first temporal phase of the energy dissipation behavior is determined by at least one outer crush zone element of the vehicle.

3. The device as recited in claim 1, wherein the control unit compares the local maximum value in the at least one signal curve with at least one threshold value, and, based on the comparison, classifies a crash as one of a hard crash or a soft crash.

4. The device as recited in claim 3, wherein the control unit determines the first characteristic time using a gradient calculation.

5. The device as recited in claim 3, wherein the control unit retroactively calculates, as the at least one retroactively calculated feature, at least one of (i) a maximum reached force level within the first temporal phase, (ii) a speed that has decreased within the first temporal phase, (iii) integrals over sub-regions of the signal curve within the first temporal phase, (iv) a temporal duration of the first temporal phase, (v) a rise time of the signal curve within the first temporal phase, and (vi) a gradient of at least one sub-region of the signal curve within the first temporal phase.

6. The device as recited in claim 3, wherein the control unit retroactively calculates multiple features, and wherein the control unit at least one of logically and mathematically combines the retroactively calculated features for further evaluation.

7. The device as recited in claim 3, wherein the control unit defines a second temporal phase following the first temporal phase, via a second characteristic time in the signal curve that represents the end of the second temporal phase.

8. The device as recited in claim 7, wherein the control unit determines the second characteristic time in the signal curve at least one of (i) as a function of a local maximum value occurring after the first characteristic time, (ii) via different filter curves, (iii) by a gradient calculation, and (iv) using a fixed period of time starting from the first characteristic time, (v) using a fixed decrease in speed starting from the first characteristic time, and (vi) using a specified overall speed decrease.

9. The device as recited in claim 7, wherein the control unit retroactively calculates at least one of (i) a speed that has decreased within the second temporal phase, and (ii) a minimum force level within the second temporal phase.

10. The device as recited in claim 7, wherein the control unit retroactively calculates multiple features for the second temporal phase, and wherein the control unit at least one of logically and mathematically combines the retroactively calculated features for the first and second temporal phases for further evaluation.

11. The device as recited in claim 10, wherein the control unit retroactively calculates, as the at least one retroactively calculated feature, at least one of (i) a maximum reached force level within the first temporal phase, (ii) a speed that has decreased within the first temporal phase, (iii) integrals over sub-regions of the signal curve within the first temporal phase, (iv) a temporal duration of the first temporal phase, (v) a rise time of the signal curve within the first temporal phase, and (vi) a gradient of at least one sub-region of the signal curve within the first temporal phase.

12. The device as recited in claim 1, wherein the control unit determines the first characteristic time via one of (i) a signal decrease or (ii) an integrated signal decrease, one of absolute or relative to the local maximum value.

13. A device for controlling a personal protection apparatus in a vehicle, comprising:
   at least one sensor unit that acquires at least one physical quantity; and
   an control unit that (i) produces, from the at least one acquired physical quantity, at least one signal curve characterizing an impact, (ii) determine, as a function of an energy dissipation behavior of the vehicle, at least one temporal phase in the produced signal curve, and (iii) evaluates the at least one temporal phase for crash classification and for a triggering decision for the personal protection apparatus;
   wherein the control unit determines at least one first characteristic time in the signal curve, the first characteristic time being an end of a first temporal phase, and, based on the determined first characteristic time, the control unit retroactively calculates at least one feature of an energy dissipation that occurred within the first temporal phase, and wherein the control unit carries out the crash classification and the triggering decision for the personal protection apparatus as a function of the at least one retroactively calculated feature;
   wherein the control unit filters the at least one signal curve with at least two different strengths to produce at least two filter curves, and determines the first characteristic time to be a first point in time at which the two filter curves at least one of: (i) touch each other, and (ii) cross each other.

14. The device as recited in claim 13, wherein the control unit retroactively calculates, as the at least one retroactively calculated feature, at least one of (i) a maximum reached force level within the first temporal phase, (ii) a speed that has decreased within the first temporal phase, (iii) integrals over sub-regions of the signal curve within the first temporal phase, (iv) a temporal duration of the first temporal phase, (v) a rise time of the signal curve within the first temporal phase, and (vi) a gradient of at least one sub-region of the signal curve within the first temporal phase.

* * * * *